(12) United States Patent
Lian

(10) Patent No.: US 7,417,622 B2
(45) Date of Patent: Aug. 26, 2008

(54) MOUSE SCROLL DEVICE

(75) Inventor: Hui-Pin Lian, Changhua (TW)

(73) Assignee: Yankee Technology Co., Ltd., Chanhua (TW)

(*) Notice: Subject to any disclaimer, the term of this patent is extended or adjusted under 35 U.S.C. 154(b) by 552 days.

(21) Appl. No.: 11/011,172

(22) Filed: Dec. 15, 2004

(65) Prior Publication Data
US 2006/0125791 A1    Jun. 15, 2006

(51) Int. Cl.
G09G 5/08 (2006.01)

(52) U.S. Cl. .................. 345/163; 345/156; 345/158; 345/159; 345/162

(58) Field of Classification Search ......... 345/156–169, 345/174, 173, 184, 685, 684, 419, 473, 619, 345/100; 439/152; 713/300, 324, 1; 710/1; 715/857
See application file for complete search history.

(56) References Cited

U.S. PATENT DOCUMENTS

| | | | |
|---|---|---|---|
| 6,198,473 B1 * | 3/2001 | Armstrong | 345/163 |
| 6,611,921 B2 * | 8/2003 | Casebolt et al. | 713/324 |
| 7,145,548 B2 * | 12/2006 | Large | 345/156 |
| 2001/0011995 A1 * | 8/2001 | Hinckley et al. | 345/156 |
| 2001/0015718 A1 * | 8/2001 | Hinckley et al. | 345/156 |
| 2002/0084986 A1 * | 7/2002 | Armstrong | 345/163 |
| 2003/0006962 A1 * | 1/2003 | Bajramovic | 345/158 |
| 2003/0137489 A1 * | 7/2003 | Bajramovic | 345/158 |
| 2003/0156098 A1 * | 8/2003 | Shaw et al. | 345/163 |
| 2004/0030807 A1 * | 2/2004 | Wessler et al. | 710/1 |
| 2004/0246231 A1 * | 12/2004 | Large | 345/163 |
| 2005/0101314 A1 * | 5/2005 | Levi | 455/423 |
| 2005/0275637 A1 * | 12/2005 | Hinckley et al. | 345/173 |
| 2006/0038783 A1 * | 2/2006 | Shaw et al. | 345/163 |
| 2006/0125491 A1 * | 6/2006 | Grishin et al. | 324/563 |
| 2006/0202954 A1 * | 9/2006 | Ho | 345/156 |
| 2007/0018970 A1 * | 1/2007 | Tabasso et al. | 345/184 |
| 2007/0128899 A1 * | 6/2007 | Mayer | 439/152 |
| 2007/0139379 A1 * | 6/2007 | Kehlstadt et al. | 345/163 |

* cited by examiner

*Primary Examiner*—Prabodh Dharia
(74) *Attorney, Agent, or Firm*—Troxell Law Office, PLLC

(57) ABSTRACT

An improved mouse scroll device installs a scroll sensing plate integrally coupled and neatly aligned with the main body of a mouse for providing an appropriate position to operate the mouse easily, and the scroll sensing plate is coupled to a microprocessor. After the neatly arranged scroll sensing plate is touched or slid back and forth by fingers or the scroll sensing plate is clicked for several times, a signal is transmitted from the microprocessor to a computer system through a universal serial bus (USB) port or a radio set to control the scroll page function on a screen of a display device or the middle button function to facilitate the operation and provides a protrusion-free artistic look effect as well as reducing the number of components and lowering the cost.

3 Claims, 4 Drawing Sheets

Fig. 1-A

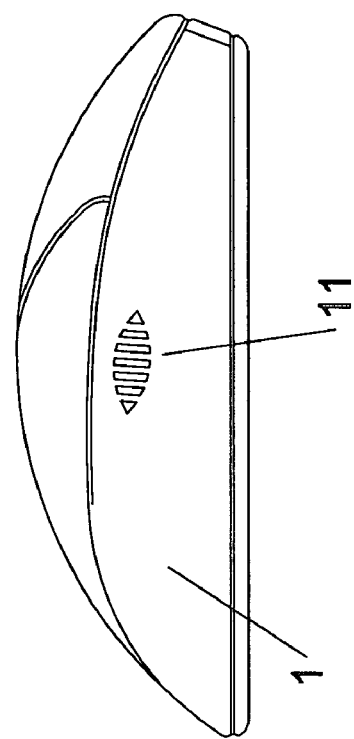
Fig. 2
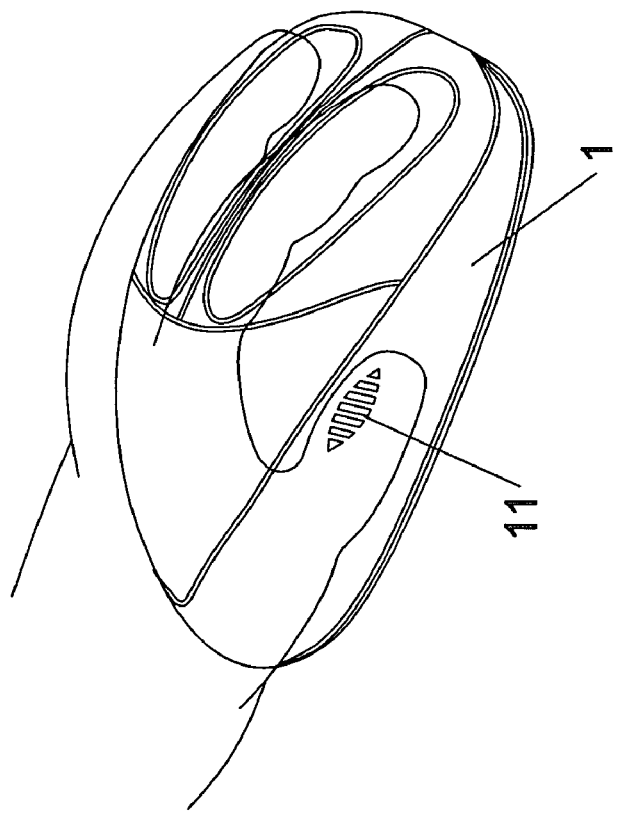
Fig. 2-A

Fig. 3-A

MOUSE SCROLL DEVICE

BACKGROUND OF THE INVENTION

1. Field of the Invention

This invention relates to an improved mouse scroll device, more particularly to a mouse scroll device that installs a neatly aligned scroll sensing plate integrally coupled with the housing of a mouse and disposed at an appropriate position for providing an easy-to-operate position for users' fingers. After the neatly arranged scroll sensing plate is touched or slid back and forth by fingers or clicked for several times, a signal is transmitted from the microprocessor to a computer system through a universal serial bus (USB) port or a radio set to control the page up/down functions on the screen of a display device or provide a middle button function to facilitate the operation and give a protrusion-free artistic look effect as well as reduce the number of components, facilitate the assembling process, and lower the cost.

2. Description of the Related Art

A traditional mouse including a wireless mouse usually comes with a roller acting as a middle button, and the roller is rotated to control the scroll of a screen on a display device or the middle roller button is pressed to provide various different functions, and control horizontal shifts and different scrolls. The traditional mouse has the following shortcomings:

1. A mouse using roller as the middle button usually relates to a complicated structure, a difficult assembling process, and a high cost.

2. When the roller is rotated for controlling a computer operation, a user's fingers must be placed and suspended on the roller, and the fingers will become stiffed after using the mouse for a while, or cause occupational diseases after using the mouse for long time.

3. The roller is protruded from the plane of the mouse, and thus ruining the artistic look of the mouse and causing troubles to users if the roller is touched by mistake.

SUMMARY OF THE INVENTION

Therefore, it is an objective of the present invention to overcome the foregoing shortcomings by integrally coupling a neatly aligned scroll sensing plate with a mouse to form a smooth surface of the mouse by means of the sensing plate, such that the scroll sensing plate is provided for a user's fingers to slide and touch the mouse, and the scroll sensor can transmit the sensed signal to a microprocessor, and drive the microprocessor to output a control signal to a computer system through a universal serial bus (USB) or a radio set. A user can scroll the screen on a display device by clicking or sliding the scroll sensing plate back and forth by fingers to facilitate the operation and maintain the artistic look of the mouse. The scroll sensing plate of the present invention could be disposed on the left side, the right side, or the roller position of the mouse for a user to choose an operation by the user's left hand, right hand or the middle finger respectively.

BRIEF DESCRIPTION OF THE DRAWINGS

FIG. 1A is a view of using the mouse as depicted in FIG. 1.

FIG. 2 is a side view of a mouse being used by a user's left hand according to the present invention.

FIG. 2A is a view of using the mouse as depicted in FIG. 2.

FIG. 3A is a view of using the mouse as depicted in FIG. 3.

DETAILED DESCRIPTION OF THE PREFERRED EMBODIMENTS

Figure 1:
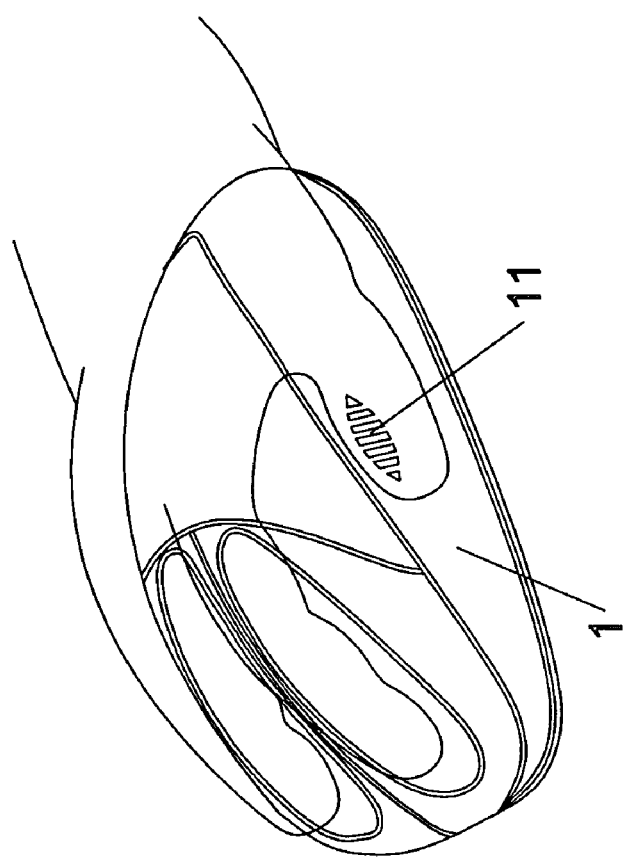
FIG. 1 is a side view of a mouse being used by a user's right hand according to the present invention.
Figure 1:
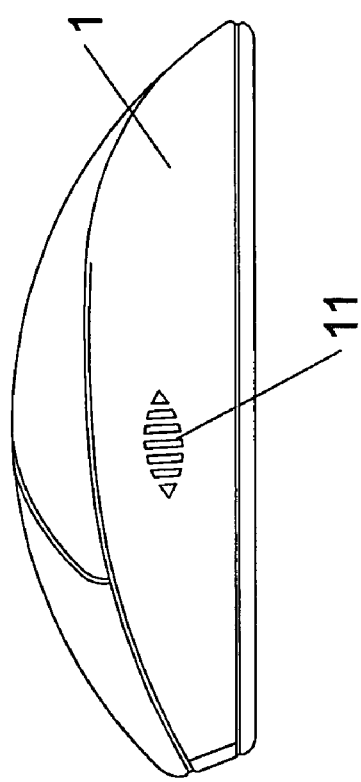
Figure 3:
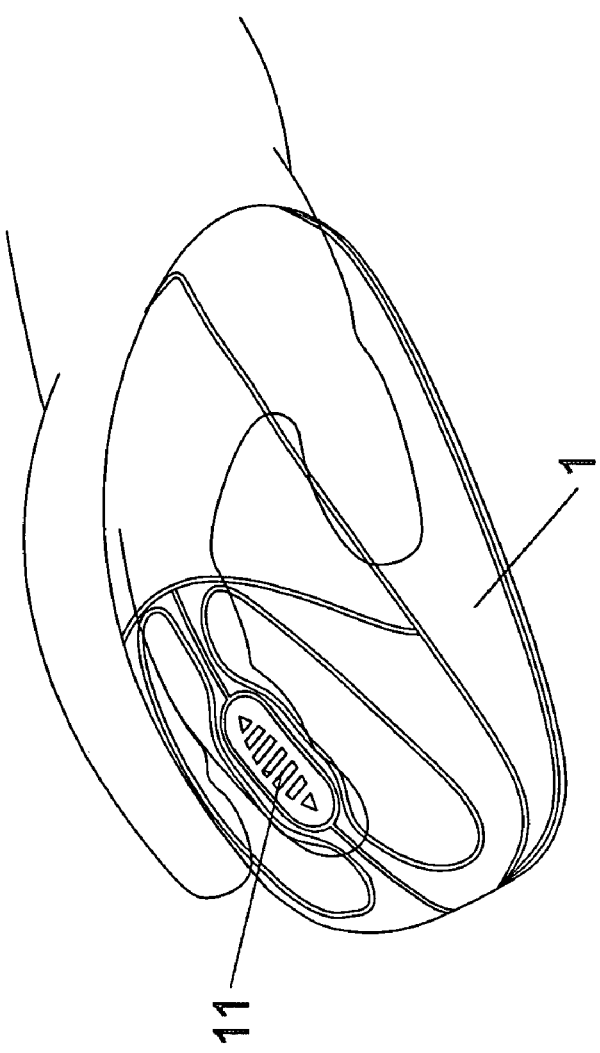
FIG. 3 is a top view of a mouse being used by a user's middle finger according to the present invention.
Figure 3:
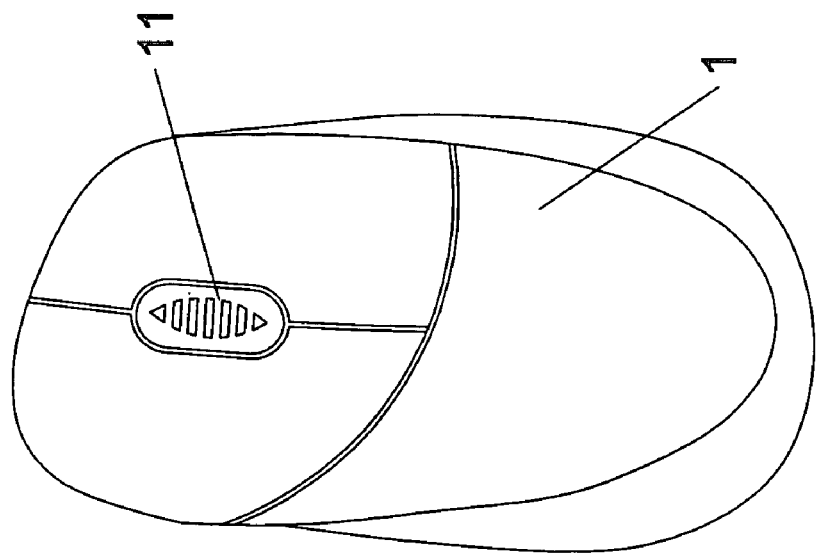
Figure 4:
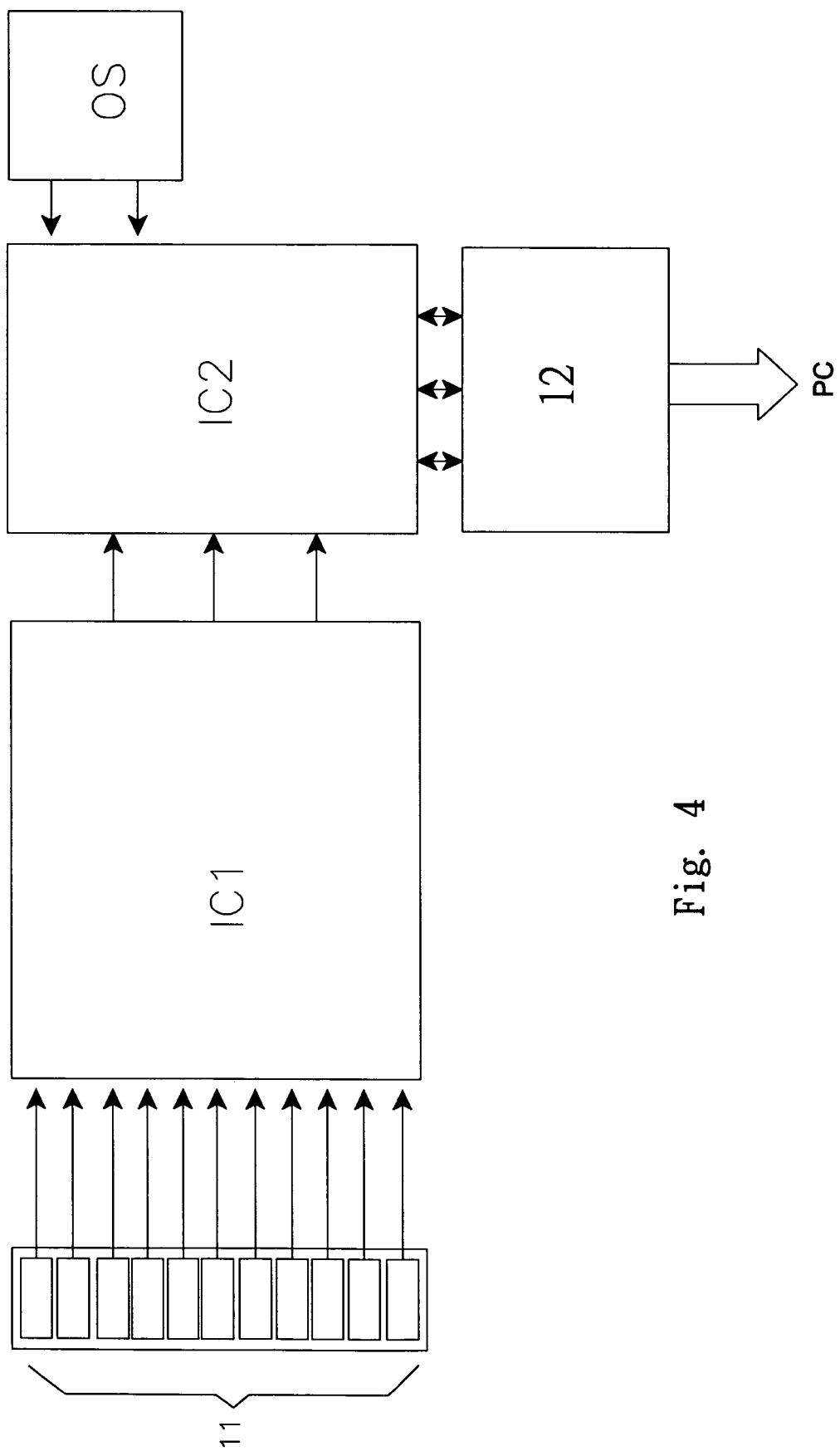
FIG. 4 is a block diagram of the control device according to the present invention.

Please refer to FIGS. 1 to 4. A neatly aligned scroll sensing plate 11 is integrally coupled with a mouse 1 and disposed on the left side (as shown in FIG. 1), the right side (as shown in FIG. 2), or between the left or right buttons (as shown in FIG. 3) of a mouse 1 and the scroll sensing plate 11 and the surface of the mouse 1 are on the same plane, so that a user can directly touch or slide the scroll sensing plate 11 back and forth by a right thumb (as shown in FIG. 1A), a left thumb (as shown in FIG. 2B) or a middle finger (as shown in FIG. 3) respectively to facilitate the operation and maintain the protrusion-free artistic look of the mouse 1.

In FIG. 2, the neatly aligned scroll sensing plate 11 is coupled to the output end of a scroll sensor IC1, and the output end of the scroll sensor IC1 is coupled to the input end of a microprocessor IC2, and the output end of the microprocessor IC2 is coupled to the output end of a universal serial (USB) port or a radio set 12, such that the output end of the USB port 12 is coupled to a personal computer (PC) and a mouse optical sensor (OS) is coupled to another input end of the microprocessor IC2. When a user touches the scroll sensing plate 11 by fingers and slides the mouse forward or backward to send a sensed signal to the microprocessor IC2 through the scroll sensor 11 for determination, and then outputs a control signal to the personal computer (PC) through the USB port or a radio set 12 for controlling the scroll movement of the screen of a displace device. Further, the scroll sensing plate 1 can be clicked for several times by fingers, so that the microprocessor IC2 will output a control signal to generate the middle button function as to provide a convenient control and a quick assembling process as well as reducing the quantity of components and lowering the cost.

What is claimed is:

1. A mouse scroll device for a personal computer comprising:

a mouse having:

a) a left button;

b) a right button;

c) a scroll sensing plate sensing touching and a sliding movement applied from an exterior of the mouse and controlling a scroll movement of a screen of a display device of the personal computer;

d) a scroll controller, the scroll sensing plate is coupled to an input end of the scroll controller;

e) a microprocessor;

f) a transmission set, an output end of said microprocessor being coupled to an input end of the transmission set; and g) a mouse optical sensor, an output end of the scroll controller is coupled to a first input end of the microprocessor and the mouse optical sensor is coupled to a second input end of the microprocessor, wherein when a user touches the scroll sensing plate by selectively touching and sliding relative the scroll sensing plate, the scroll sensing plate sending a first sensed signal to the microprocessor through the scroll sensor for determination, and the microprocessor outputting a first control signal to the personal computer through the transmission set for controlling the scroll movement of the screen of the display device of the personal computer, wherein when the user touches the scroll sensing plate by selectively touching the scroll sensing plate a predetermined number of times, the scroll sensing plate sending a second sensed signal to the microprocessor through the scroll sensor for determination, and the microprocessor outputting a second control signal to the personal computer through the transmission set producing a middle button function utilizing the scroll sensing plate.

wherein the scroll sensing plate is located between the left button and the right button.

2. The mouse scroll device according to claim 1, wherein the scroll sensing plate is integrally coupled with the mouse and disposed on a same plane with a surface of a housing of the mouse.

3. The mouse scroll device according to claim 1, wherein the transmission set is selected from a group consisting of a universal serial port connected to the computer and a radio set communicating with the computer.

* * * * *